(12) United States Patent
Liu

(10) Patent No.: US 12,538,399 B2
(45) Date of Patent: Jan. 27, 2026

(54) SYSTEM FOR CONTROLLING, AND CAPABLE OF SECTIONALIZED VOLTAGE STABILIZATION OF, RGB OR RGBW LED STRIPS

(71) Applicant: Yung-Chen Hsu, New Taipei (TW)

(72) Inventor: Yan Liu, Guangdong (CN)

(73) Assignee: Yung-Chen Hsu, New Taipei (TW)

( * ) Notice: Subject to any disclaimer, the term of this patent is extended or adjusted under 35 U.S.C. 154(b) by 117 days.

(21) Appl. No.: 18/456,945

(22) Filed: Aug. 28, 2023

(65) Prior Publication Data

US 2024/0114608 A1   Apr. 4, 2024

(30) Foreign Application Priority Data

Sep. 29, 2022   (CN) .......................... 202222596466.5

(51) Int. Cl.
  *H05B 45/20*   (2020.01)
  *H05B 45/34*   (2020.01)
  *H05B 47/19*   (2020.01)

(52) U.S. Cl.
  CPC ............. *H05B 45/34* (2020.01); *H05B 45/20* (2020.01); *H05B 47/19* (2020.01)

(58) Field of Classification Search
  CPC ........ H05B 45/10; H05B 45/20; H05B 45/30; H05B 45/34; H05B 45/345; H05B 47/10; H05B 47/105; H05B 47/11; H05B 47/14; H05B 47/155; H05B 47/175; H05B 47/19
  See application file for complete search history.

(56) References Cited

U.S. PATENT DOCUMENTS

| | | | |
|---|---|---|---|
| 10,512,144 B1* | 12/2019 | Shen ...................... | H05B 45/20 |
| 2023/0254957 A1* | 8/2023 | Kanemitsu ........... | H05B 45/345 |
| | | | 315/96 |

* cited by examiner

*Primary Examiner* — Long Nguyen

(74) *Attorney, Agent, or Firm* — RABIN & BERDO, P.C.

(57) ABSTRACT

A system for controlling, and capable of sectionalized voltage stabilization of, RGB or RGBW light-emitting diode (LED) strips includes a main controller and a plurality of sectional controllers. The main controller can connect with more than one sectional controller at the same time. Each sectional controller is provided therein with a voltage reduction module and can be coupled in parallel, and supply electricity stably, to a plurality of LED strips (which may be RGB or RGBW LED strips). The main controller is configured to receive and process an externally input operation signal and output a main control signal. Each sectional controller is configured to receive and analyze the main control signal and control the ON time, current, and light emission interval of each corresponding LED strip according to the corresponding instruction in the main control signal in order to effect various changes in light.

20 Claims, 4 Drawing Sheets

SYSTEM FOR CONTROLLING, AND CAPABLE OF SECTIONALIZED VOLTAGE STABILIZATION OF, RGB OR RGBW LED STRIPS

BACKGROUND OF THE INVENTION

1. Technical Field

The present invention relates to a system configured for controlling RGB (red, green, and blue) or RGBW (red, green, blue, and white) light-emitting diode (LED) strips and capable of stabilizing the voltage of the RGB or RGBW LED strips in a sectionalized manner. More particularly, the invention relates to a control system configured to effectively solve the voltage drop problem of multiple parallel-connected LED strips and thereby stabilize the power supplied to, and increase the brightness of, the LED strips.

2. Description of Related Art

The term "RGB or RGBW LED strip" refers to an LED strip each LED unit soldered to which is composed of a red LED chip, a green LED chip, and a blue LED chip. In use, each of the red, green, and blue LED chips can emit single-color light (i.e., the corresponding red, green, or blue light) alone, or any two or the three of the red, green, and blue LED chips can emit light at the same time in order to mix different single-color light at different brightness levels, thereby allowing the RGB or RGBW LED strip to emit light of any static color, including warm white or cool white. It is feasible for the RGB or RGBW LED strip to emit only warm white light or emit different color light in an abruptly or gradually changing manner.

The LED units of an RGB or RGBW LED strip are controlled by a dedicated integrated circuit (IC) chip so that each pixel (i.e., LED unit) in an RGB or RGBW LED strip system can be changed in color, brightness, and the light emission order so as to produce a variety of changing light effects in which the LED units emit light sequentially, or in a flowing manner, or like the tail of a shooting star, or in a scanning fashion. A screen composed of such LED strips can show text, graphics, and videos, among other complicated changing light effects.

The LED units of an early LED strip are usually connected in series. The series connection, however, tends to cause a rapid drop in the supply voltage and thus render the supply voltage unstable as the number of LED units increases. Moreover, should any of the LED units be damaged and form an open circuit, none of the series-connected LED units will be supplied with electricity, meaning the entire LED strip will not work. Consequently, this type of LED strips has gradually been eliminated from the market.

Today, most of the LED strips include LED units that are connected in parallel instead, which not only allows a stable voltage to be supplied to each LED unit of the LED strip at the same time, but also prevents the aforesaid drawback that the failure of a single LED unit will affect the operation of the other LED units. As the number of parallel-connected LED strips increases, however, so does the current load of the entire system, and this may also cause a voltage drop, reducing the brightness of each LED unit.

To improve the foregoing drawbacks of the power supply methods of the conventional LED strips, the inventor of the present invention conducted an extensive research and experiment and finally succeeded in developing the invention disclosed herein.

BRIEF SUMMARY OF THE INVENTION

The primary objective of the present invention is to provide a system for controlling, and capable of sectionalized voltage stabilization of, RGB or RGBW LED strips. The system includes a main controller connected to more than one sectional controller. The main controller is configured to receive and process an operation signal input from outside the system and output a main control signal. Each sectional controller is configured to receive and analyze the main control signal and control the ON time, current, and light emission interval of each corresponding LED strip according to the corresponding instruction in the main control signal, thereby enabling the control of different changes in light. In addition, each sectional controller is provided therein with a voltage reduction module and is coupled in parallel, and configured to supply electricity stably, to a plurality of LED strips (which may be RGB or RGBW LED strips), thereby overcoming the prior art drawback that a plurality of parallel-connected LED strips are subject to a voltage drop that may affect the brightness of each LED strip.

Another objective of the present invention is to provide the foregoing system for controlling, and capable of sectionalized voltage stabilization of, RGB or RGBW LED strips, wherein: each sectional controller is coupled in parallel to the main controller, the LED strips corresponding to each sectional controller are coupled in parallel to the sectional controller, and the LED units of each LED strip are coupled in parallel to one another such that each LED unit is supplied with electricity independently. Even if one of the LED units is damaged, the operation of the other LED units and of the LED strips to which the damaged LED unit does not belong will not be affected. This helps enhance the quality of the entire LED strip system.

To achieve the aforementioned objectives and technical effects, the system of the present invention comprises: a main controller (1) for receiving externally input direct-current (DC) supply power and an externally input operation signal, analyzing and processing the operation signal, and outputting a main control signal; and a plurality of sectional controllers (2; 3) electrically connected in parallel to the main controller (1), wherein each said sectional controller (2; 3) is coupled in parallel to a plurality of LED strips (4), each said sectional controller (2; 3) is configured to receive the DC supply power from the main controller (1) and convert the DC supply power into an output voltage suitable for use by each said LED strip (4) coupled in parallel to the each said sectional controller (2; 3), in order to supply electricity stably to each said LED strip (4) coupled in parallel to the each said sectional controller (2; 3), and each said sectional controller (2; 3) is also configured to receive the main control signal output from the main controller (1) and to analyze and process the main control signal into different output control signals each causing a corresponding one of the LED strips (4) coupled in parallel to the each said sectional controller (2; 3) to produce a corresponding change in light.

According to the aforementioned structure, wherein the main controller (1) has a microcontroller module (12), a clock module (13), and a communication protocol module (15), the microcontroller module (12) has a microcontroller unit (MCU) storing firmware required for operation of the microcontroller unit (MCU), the clock module (13) is coupled to the microcontroller module (12) and is configured to synchronize frequencies of signals sent out by the microcontroller module (12), and the communication protocol module (15) is coupled to the microcontroller module (12) and is configured to perform signal encoding in cooperation with the microcontroller module (12) in order for the microcontroller module (12) to send out the main control signal, wherein the main control signal is executable by the sectional controllers (2; 3).

According to the aforementioned structure, wherein the communication protocol module (15) generates encoded contents including but not limited to at least one of a guide code, an address code, a function code, a signal accumulation code or a check code.

According to the aforementioned structure, wherein the main controller (1) comprises a wireless receiver module (14) coupled to the microcontroller module (12), and the wireless receiver module (14) is configured to receive the operation signal, which is transmitted wirelessly by an external remote control, and guide the operation signal into the microcontroller module (12) for analysis and compiling.

According to the aforementioned structure, wherein the main controller (1) comprises a voltage stabilizer module (11), and the voltage stabilizer module (11) is configured to transform and stabilize the DC supply power input into the main controller (1) and convert the DC supply power into a stabilized DC voltage suitable for use by each said module in the main controller (1).

According to the aforementioned structure, wherein each said sectional controller (2; 3) is provided therein with a voltage reduction module (23; 33) and a sectional control module (24; 34), each said voltage reduction module (23; 33) is configured to receive the DC supply power and produce a corresponding said output voltage by voltage reduction and voltage stabilization, and each said sectional control module (24; 34) is configured to receive the main control signal and convert the main control signal into corresponding said output control signals.

According to the aforementioned structure, wherein the main controller (1) comprises a main input connector (17) and a main output connector (18), the main input connector (17) has a DC input contact (DCin) and a grounding contact (GND) and is configured to receive the DC supply power, the main output connector (18) has a DC output contact (DCout) and a grounding contact (GND), and the DC output contact (DCout) and the grounding contact (GND) of the main output connector (18) are in communication with the DC input contact (DCin) and the grounding contact (GND) of the main input connector (17) respectively.

According to the aforementioned structure, wherein the main output connector (18) comprises a control contact (TX) electrically connected to the microcontroller module (12) in order to guide the main control signal outward.

According to the aforementioned structure, wherein each said sectional controller (2; 3) comprises a sectional input connector (21; 31); each said sectional input connector (21; 31) has a DC input contact (DCin), a control contact (TX), and a grounding contact (GND); and the DC input contact (DCin), the control contact (TX), and the grounding contact (GND) of the sectional input connector (21; 31) of each said sectional controller (2; 3) are configured to be electrically connected to the DC output contact (DCout), the control contact (TX), and the grounding contact (GND) of the main output connector (18) respectively in order to guide the DC supply power and the main control signal into the each said sectional controller (2; 3).

According to the aforementioned structure, wherein each said sectional controller (2; 3) comprises output bases (CN1, CN2; CN3, CN4) each serving as an interface for coupling a corresponding said output voltage and each corresponding said output control signal to a corresponding one of the LED strips (4) coupled in parallel to the each said sectional controller (2; 3).

BRIEF DESCRIPTION OF THE SEVERAL VIEWS OF THE DRAWINGS

The above objectives, effects, and features of the present invention can be better understood by referring to the following detailed description in conjunction with the accompanying drawings, in which.

DETAILED DESCRIPTION OF THE INVENTION

Figure 1:
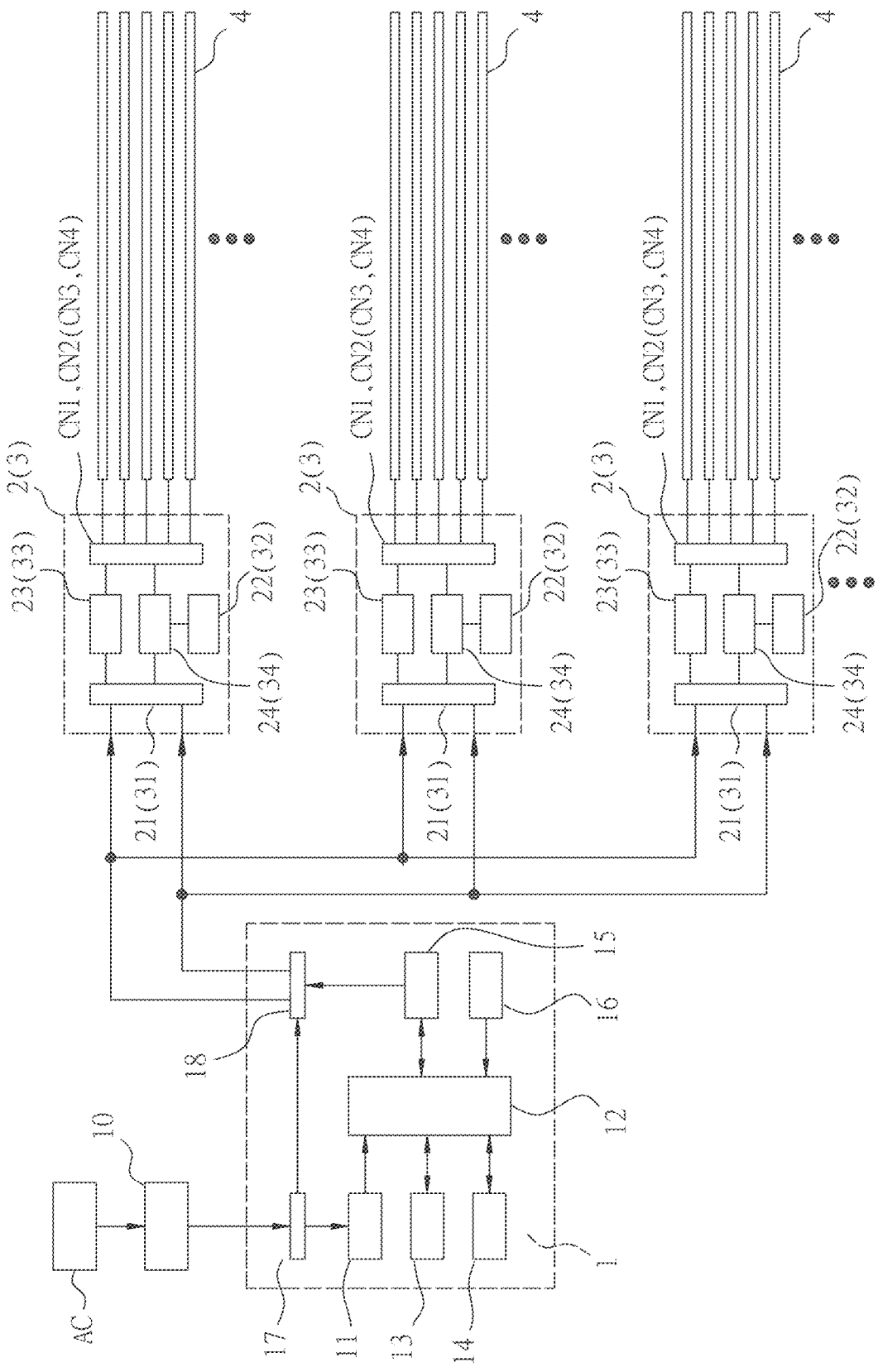
FIG. 1 is a block diagram showing the structure of the entire system of the invention.

Referring to FIG. 1, the structure of the entire system of the present invention essentially includes a main controller 1 and a plurality of sectional controllers 2 (or a plurality of sectional controllers 3). The main controller 1 is composed of a voltage stabilizer module 11, a microcontroller module 12, a clock module 13, a wireless receiver module 14, and a communication protocol module 15.

The voltage stabilizer module 11 is connected to an external transformer and rectifier module 10 through a main input connector 17. The transformer and rectifier module 10 may be an alternating-current (AC) adapter for transforming, rectifying, and filtering AC mains electricity (about 100-220 V) and thereby converting the AC mains electricity into the desired direct-current (DC) supply power (about 12-60 V). The voltage stabilizer module 11 is configured to transform and stabilize (to about 3.3 V) the DC supply power output from the transformer and rectifier module 10, in order to provide stable DC power to the microcontroller module 12 and the other modules, lest an unstable voltage fluctuation cause the main controller 1 to work erroneously or malfunction.

The microcontroller module 12 is coupled to the clock module 13, the wireless receiver module 14, and the communication protocol module 15 separately. The microcontroller module 12 stores the firmware required for its operation (i.e., for controlling each sectional controller 2 or 3). The clock module 13 is configured to provide the reference clock frequency required by the microcontroller module 12. The wireless receiver module 14 is configured to receive the operation signal transmitted wirelessly by an external remote control, in order for the microcontroller module 12 to analyze and process (e.g., compile) the received operation signal, perform clock synchronization via the clock module 13, and then output communication data at a fixed period that ensures the requirement of synchronization between the different modules is met. The communication protocol module 15 is configured to perform encoding according to the communication data output from the microcontroller module 12, and the encoded contents include, but are not limited to, at least one of a guide code, an address code, a function code, a signal accumulation code or a check code. The encoded information generated by the communication protocol module 15 is sent out by the microcontroller module 12. For example, a main control signal is output by the microcontroller module 12 through a main output connector 18.

It is worth mentioning that the main output connector 18 is provided therein with a set of power contacts connected directly to the main input connector 17 so that the plurality of parallel-connected sectional controllers 2 (or 3) can receive electricity directly from the main controller 1 during use; in other words, there is no need to connect the sectional controllers 2 (or 3) to the power source through additional wires. This technical feature provides convenience of use.

Each sectional controller 2 (or 3) is provided therein with a voltage reduction module 23 (or 33) and a sectional control module 24 (or 34). The voltage reduction module 23 (or 33) and the sectional control module 24 (or 34) of each sectional controller 2 (or 3) are connected to the main output connector 18 of the main controller 1 through a sectional input connector 21 (or 31). The voltage reduction module 23 (or 33) of each sectional controller 2 (or 3) is configured to receive the DC supply power output from the transformer/and rectifier module 10, reduce the voltage of the DC supply power (to about 5 V), stabilize the voltage-reduced DC supply power, and supply power to each of a plurality of LED strips 4 (which may be RGB or RGBW LED strips) through the corresponding one of a plurality of output bases CN1 and CN2 (or CN3 and CN4), wherein the voltage reduction module 23 (or 33) is connected to the LED strips 4 through the output bases CN1 and CN2 (or CN3 and CN4). The sectional control module 24 (or 34) of each sectional controller 2 (or 3) is configured to receive the main control signal output from the main controller 1 (or by the microcontroller module 12 to be exact), analyze and process the main control signal, and control the corresponding LED strips 4 through the corresponding output bases CN1 and CN2 (or CN3 and CN4) according to data corresponding to the ID address of the sectional control module 24 (or 34), in order for the corresponding LED strips 4 to output different or changing light (which may be different, or change, in color, brightness, and the LED ON time).

Figure 2:
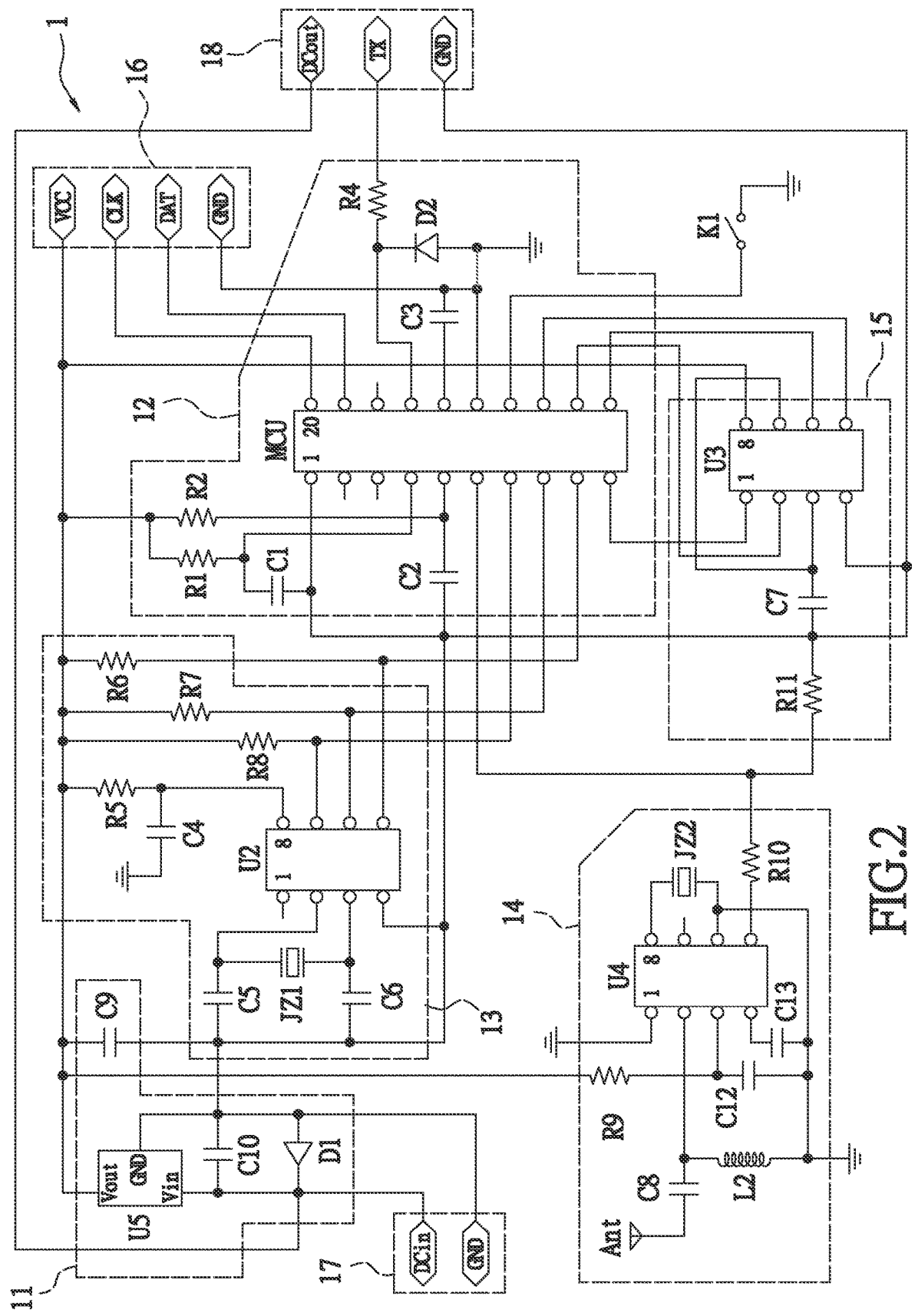
FIG. 2 is a circuit diagram of a feasible embodiment of the main controller in the invention.

As shown in FIG. 2, the main controller 1 in the present invention includes the voltage stabilizer module 11, the microcontroller module 12, the clock module 13, the wireless receiver module 14, the communication protocol module 15, and such auxiliary components as a programming socket 16, the main input connector 17, and the main output connector 18. The main input connector 17 has a DC input contact DCin and a grounding contact GND, and the DC input contact DCin and the grounding contact GND are directly electrically connected to the external transformer and rectifier module 10 in order to receive the DC supply power (about 12-60 V) output from the transformer and rectifier module 10. The main output connector 18 has a DC output contact DCout, a control contact TX, and a grounding contact GND. The DC output contact DCout and the grounding contact GND of the main output connector 18 are connected to the DC input contact DCin and the grounding contact GND of the main input connector 17 respectively in order to guide the DC supply power outward.

The voltage stabilizer module 11 is composed of a three-terminal voltage stabilization element U5, a diode D1, and capacitors C9 and C10. The input terminal Vin of the three-terminal voltage stabilization element U5 is electrically connected to the DC input contact DCin in order to guide into the three-terminal voltage stabilization element U5 the DC supply power output from the transformer/and rectifier module 10. The output terminal Vout of the three-terminal voltage stabilization element U5 is used to output a stabilized DC voltage (about 3.3 V). The output terminal Vout of the three-terminal voltage stabilization element U5 is also electrically connected to the VCC contact of the programming socket 16.

The microcontroller module 12 has a microcontroller unit MCU, which stores the firmware required for its operation. The fifth pin of the microcontroller unit MCU is electrically connected to the output terminal Vout of the three-terminal voltage stabilization element U5 through a resistor R2 in order to receive the stabilized DC voltage as the electricity required for operation. In addition, the $15^{th}$ pin of the microcontroller unit MCU is grounded and is electrically connected to the GND contact of the programming socket 16, the $20^{th}$ pin of the microcontroller unit MCU is electrically connected to the CLK contact of the programming socket 16, and the $19^{th}$ pin of the microcontroller unit MCU is electrically connected to the DAT contact of the programming socket 16, so that the programming socket 16 can be coupled to an external programming device in order for the firmware required for operation of the microcontroller unit MCU to be stored into the microcontroller unit MCU. The $17^{th}$ pin of the microcontroller unit MCU is electrically connected to the control contact TX of the main output connector 18 through a resistor R4 in order to output the main control signal.

The clock module 13 is composed of an integrated circuit U2; a crystal oscillator JZ1; resistors R5, R6, R7, and R8; and capacitors C4, C5, and C6. The fourth pin of the integrated circuit U2 is grounded. The eighth pin of the integrated circuit U2 is electrically connected to the output terminal Vout of the three-terminal voltage stabilization element U5 through the resistor R5 and the capacitor C4 in order to receive the stabilized DC voltage as the electricity required for operation. The fifth, sixth, and seventh pins of the integrated circuit U2 are electrically connected to the ninth, eighth, and seventh pins of the microcontroller unit MCU respectively in order to provide the microcontroller unit MCU with the reference clock frequency it needs.

The wireless receiver module 14 is composed of an integrated circuit U4; a crystal oscillator JZ2; resistors R9 and R10; an inductor L2; capacitors C8, C12, and C13; and an antenna Ant. The third pin of the integrated circuit U4 receives the stabilized DC voltage from the output terminal Vout of the three-terminal voltage stabilization element U5 through the resistor R9 as the electricity required for operation. The antenna Ant receives the wireless control signal in order for the received signal to be oscillated and amplified by the capacitor C8 and the inductor L2 and then input into the integrated circuit U4 through the second pin thereof. The sixth and eighth pins of the integrated circuit U4 are coupled to the crystal oscillator JZ2. The seventh pin of the integrated circuit U4 is electrically connected to the sixth pin of the microcontroller unit MCU through the resistor R10 to enable signal transmission.

The communication protocol module 15 has an integrated circuit U3. The eighth pin of the integrated circuit U3 is electrically connected to the output terminal Vout of the three-terminal voltage stabilization element U5 in order to receive the stabilized DC voltage as the electricity required for operation. The first, second, fifth, and sixth pins of the integrated circuit U3 are electrically connected to the $10^{th}$, $12^{th}$, $13^{th}$ and $11^{th}$ pins of the microcontroller unit MCU respectively to enable signal transmission. The fourth pin of the integrated circuit U3 is grounded. The third and seventh pins of the integrated circuit U3 are electrically connected to the sixth pin of the microcontroller unit MCU through the resistor R11 and the capacitor C7 to enable signal transmission.

The external wireless control signal received by the antenna Ant is analyzed and processed by the integrated circuit U4 and then input into the microcontroller module 12. The microcontroller module 12, in turn, refers to the clock frequency provided by the clock module 13, processes the input signal via the communication protocol module 15, and with the $17^{th}$ pin of the microcontroller unit MCU electrically connected to the control contact (TX) of the main output connector 18 through the resistor R4, outputs the main control signal through the control contact (TX) of the main output connector 18.

Figure 3:
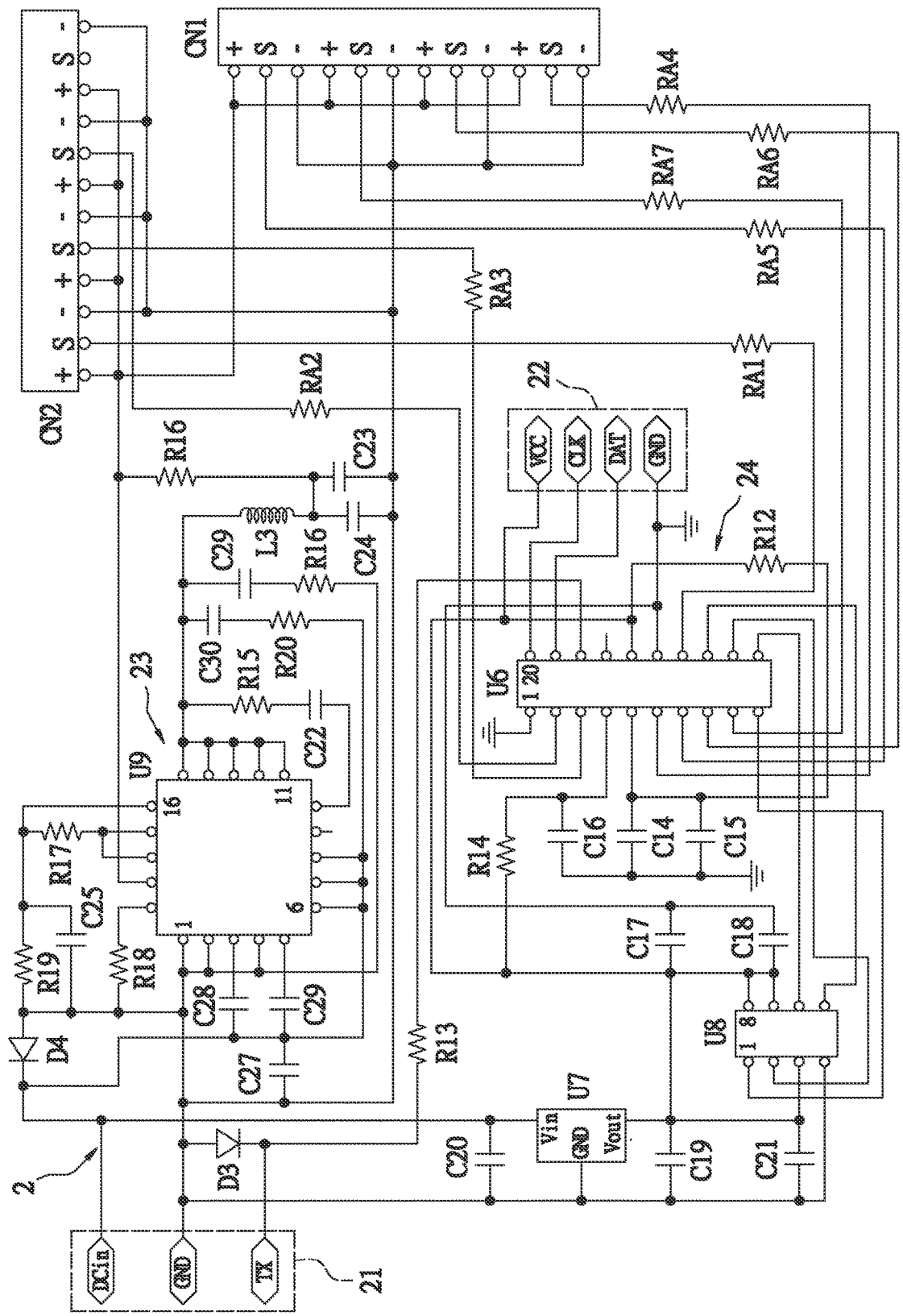
FIG. 3 is a circuit diagram of the first embodiment of the sectional controller in the invention.

Referring to FIG. 3 for a relatively-small-output-current version of the sectional controllers (i.e., the sectional controller 2) provided by the present invention, the sectional controller 2 has a circuit structure that essentially includes the sectional input connector 21, the voltage reduction module 23, and the sectional control module 24. The sectional input connector 21 is configured to connect with the main output connector 18 of the main controller 1. The sectional input connector 21 has a DC input contact DCin, a control contact TX, and a grounding contact GND, the three of which are configured to be electrically connected to the DC output contact DCout, the control contact TX, and the grounding contact GND of the main output connector 18 respectively in order to guide the aforesaid DC supply power (about 12-60 V) and main control signal into the sectional controller 2.

The voltage reduction module 23 has an integrated circuit U9. The first pin of the integrated circuit U9 is grounded. The sixth, seventh, and eighth pins of the integrated circuit U9 are electrically connected to the DC input contact DCin of the sectional input connector 21 in order to guide the DC supply power (about 12-60 V) into the voltage reduction module 23. The $19^{th}$ pin of the integrated circuit U9 is electrically connected to the output bases CN1 and CN2 in order to guide a reduced and stabilized output voltage (about 5 V) outward. More specifically, the $19^{th}$ pin of the integrated circuit U9 is coupled to the positive-voltage terminal of each of the LED strips 4 parallel-connected to each of the output bases CN1 and CN2.

The sectional control module 24 has an integrated circuit U6. The first and $15^{th}$ pins of the integrated circuit U6 are grounded. The $16^{th}$ pin of the integrated circuit U6 is electrically connected to the sectional input connector 21 through a three-terminal voltage stabilization element U7 in order to guide the stabilized DC voltage (about 3.3 V) required by the sectional control module 24 into the sectional control module 24. The $18^{th}$ pin of the integrated circuit U6 is electrically connected to the control contact TX of the sectional input connector 21 through a resistor R13 in order to guide into the sectional control module 24 the main control signal output from the main controller 1. The sixth, seventh, eighth, and ninth pins of the integrated circuit U6 are electrically connected to the output base CN1 through resistors RA4, RA5, RA6, and RA7 respectively in order to each output an output control signal for controlling the operation of the corresponding one of the LED strips 4 parallel-connected to the output base CN1. The second, third, and $14^{th}$ pins of the integrated circuit U6 are electrically connected to the output base CN2 through resistors RA2, RA3, and RA1 respectively in order to each output an output control signal for controlling the operation of the corresponding one of the LED strips 4 parallel-connected to the output base CN2.

Besides, the $15^{th}$ pin of the integrated circuit U6 is also electrically connected to the GND contact of a programming socket 22, the $16^{th}$ pin of the integrated circuit U6 is electrically connected to the VCC contact of the programming socket 22, the $20^{th}$ pin of the integrated circuit U6 is electrically connected to the CLK contact of the programming socket 22, and the $19^{th}$ pin of the integrated circuit U6 is electrically connected to the DAT contact of the programming socket 22, so that the programming socket 22 can be coupled to an external programming device in order for the firmware required for operation of the integrated circuit U6 to be stored into the integrated circuit U6.

The voltage reduction module 23 is configured to convert the DC supply power (about 12-60 V) guided in by the sectional input connector 21 into a stable output voltage (about 5 V). The voltage reduction module 23 is connected to the output bases CN1 and CN2 and hence to the LED strips 4 (which may be RGB or RGBW LED strips) parallel-connected to each of the output bases CN1 and CN2. The grounding terminal of each LED strip 4 may be coupled to the internal grounding terminal of the sectional controller 2 through the corresponding output base CN1 or CN2. The main control signal output from the main controller 1 is received by the control contact TX of the sectional input connector 21, is analyzed and processed by the integrated circuit U6, and is output through the output bases CN1 and CN2 as different output control signals each causing the corresponding LED strip 4 to produce a different changing light effect.

As the integrated circuit U6 of the sectional control module 24 has a relatively low computation speed and a relatively small internal storage space, and given the output power limit of the voltage reduction module 23, the sectional controller 2 is suitable for use only in applications where a relatively small number of (about 500 or fewer) LED strips 4 are used.

Figure 4:
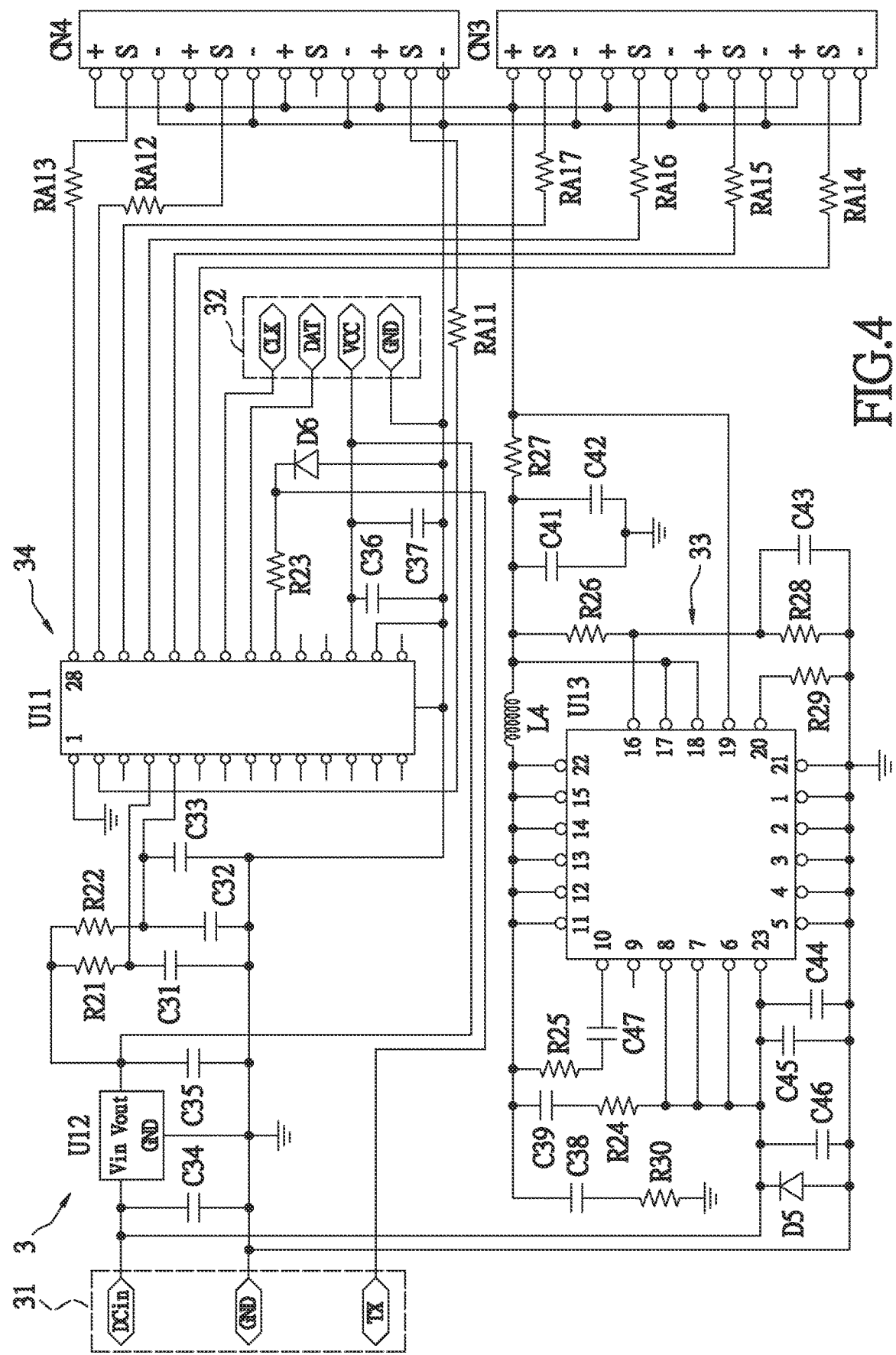
FIG. 4 is a circuit diagram of the second embodiment of the sectional controller in the invention.

Referring to FIG. 4 for a relatively-large-output-current version of the sectional controllers (i.e., the sectional controller 3) provided by the present invention, the sectional controller 3 has a circuit structure that essentially includes the sectional input connector 31, the voltage reduction module 33, and the sectional control module 34. The sectional input connector 31 is configured to connect with the main output connector 18 of the main controller 1. The sectional input connector 31 has a DC input contact DCin, a control contact TX, and a grounding contact GND, the three of which are configured to be electrically connected to the DC output contact DCout, the control contact TX, and the grounding contact GND of the main output connector 18 respectively in order to guide the aforesaid DC supply power (about 12-60 V) and main control signal into the sectional controller 3.

The voltage reduction module 33 has an integrated circuit U13. The first, second, third, fourth, fifth, and $21^{st}$ pins of the integrated circuit U13 are grounded. The sixth, seventh, eighth, and $23^{rd}$ pins of the integrated circuit U13 are electrically connected to the DC input contact DCin of the sectional input connector 31 in order to guide the DC supply power (about 12-60 V) into the voltage reduction module 33. The $11^{th}$, $12^{th}$, $13^{th}$, $14^{th}$, $15^{th}$ and $22^{nd}$ pins of the integrated circuit U13 are electrically connected to the output bases CN3 and CN4 through an inductor L14 and a resistor R27 in order guide a reduced and stabilized output voltage (about 5 V) outward. More specifically, the $11^{th}$, $12^{th}$, $13^{th}$, $14^{th}$, 15th, and 22nd pins of the integrated circuit U13 are coupled to the positive-voltage terminal of each of the LED strips 4 parallel-connected to each of the output bases CN3 and CN4.

The sectional control module 34 has an integrated circuit U11. The first and 16th pins of the integrated circuit U11 are grounded. The fourth and fifth pins of the integrated circuit U11 are electrically connected to the sectional input connector 31 through resistors R21 and R22 respectively and through a three-terminal voltage stabilization element U12 in order to guide the stabilized DC voltage (about 3.3V) required by the sectional control module 34 into the sectional control module 34. The 20th pin of the integrated circuit U11 is electrically connected to the control contact TX of the sectional input connector 31 through a resistor R23 in order to guide into the sectional control module 34 the main control signal output from the main controller 1. The 23rd, 24th, 25th, and 26th pins of the integrated circuit U11 are electrically connected to the output base CN3 through resistors RA14, RA15, RA16, and RA17 respectively in order to each output an output control signal for controlling the operation of the corresponding one of the LED strips 4 parallel-connected to the output base CN3. The second, 27th, and 28th pins of the integrated circuit U11 are electrically connected to the output base CN4 through resistors RA11, RA12, and RA13 respectively in order to each output an output control signal for controlling the operation of the corresponding one of the LED strips 4 parallel-connected to the output base CN4.

In addition, the 17th pin of the integrated circuit U11 is electrically connected to the VCC contact of a programming socket 32, the 22nd pin of the integrated circuit U11 is electrically connected to the CLK contact of the programming socket 32, the 21st pin of the integrated circuit U11 is electrically connected to the DAT contact of the programming socket 32, and the GND contact of the programming socket 32 is directly grounded, so that the programming socket 32 can be coupled to an external programming device in order for the firmware required for operation of the integrated circuit U11 to be stored into the integrated circuit U11.

The voltage reduction module 33 is configured to convert the DC supply power (about 12-60 V) guided in by the sectional input connector 31 into a stable output voltage (about 5 V). The voltage reduction module 33 is connected to the output bases CN3 and CN4 and hence to the LED strips 4 (which may be RGB or RGBW LED strips) parallel-connected to each of the output bases CN3 and CN4. The grounding terminal of each LED strip 4 may be coupled to the internal grounding terminal of the sectional controller 3 through the corresponding output base CN3 or CN4. The main control signal output from the main controller 1 is received by the control contact TX of the sectional input connector 31, is analyzed and processed by the integrated circuit U11, and is output through the output bases CN3 and CN4 as different output control signals each causing the corresponding LED strip 4 to produce a different changing light effect.

As the integrated circuit U11 of the sectional control module 34 has a relatively high computation speed and a relatively large internal storage space, the output power of the voltage reduction module 33 can be increased to render the sectional controller 3 suitable for use in applications where a relatively large number of (about 1000 or more) LED strips 4 are used.

According to the present invention, the combination of the main controller 1 and the sectional controllers 2 (or 3) allows the ratio of the light emitted by the red, green, and blue LED chips of the LED units to vary in accordance with the desired display function or effect so as to produce the desired colors (e.g., at least one of warm white or red or green or blue) and brightness. Each step performed by each module in each sectional controller 2 (or 3) is based on the main control signal sent out by the main controller 1, so communication signals containing data related to the to-be-performed actions of the red, green, and blue LED chips can be transmitted simultaneously to the differently located LED units of the LED strips 4 to ensure that the main controller 1 can coordinate the sectional controllers 2 (or 3) to meet the requirement of synchronization while allowing each LED strip 4 to change its own colors independently. In addition, the voltage reduction module 23 (or 33) in each sectional controller 2 (or 3) can prevent an overly large current from causing a voltage drop, and should any of the LED strips 4 malfunction, the sectional controllers 2 (or 3), which are parallel-connected and independent from one another, and each of which is coupled in parallel to the corresponding LED strips 4, ensure that the remaining LED strips 4 will not be affected.

According to the above, the disclosed system for controlling, and capable of sectionalized voltage stabilization of, RGB or RGBW LED strips is indeed effective in solving the voltage drop problem of multiple parallel-connected LED strips and hence in stabilizing the power supplied to, and increasing the brightness of, the LED strips. As the system is a novel and non-obvious invention, a utility patent application for the invention has been filed along with this specification according to the law. It should be pointed out that the embodiments described herein are only some preferred ones of the invention. Any change, modification, alteration, or equivalent substitution that is derived from the technical means of the invention and the contents disclosed herein shall be viewed as falling within the scope of the appended claims.

What is claimed is:

1. A system for controlling, and sectionalized voltage stabilization of, RGB (red, green, and blue) or RGBW (red, green, blue, and white) light-emitting diode (LED) devices, comprising:
   a main controller (1) for receiving externally input direct-current (DC) supply power and an externally input operation signal, analyzing and processing the operation signal, and outputting a main control signal; and
   a plurality of sectional controllers (2; 3) electrically connected in parallel to the main controller (1), wherein each of said plurality of sectional controllers (2; 3) is coupled in parallel to a plurality of LED strips (4), each of said plurality of sectional controllers (2; 3) is configured to receive the DC supply power from the main controller (1) and convert the DC supply power into an output voltage suitable for use by each of said plurality of LED strips (4) coupled in parallel to each of said plurality of sectional controllers (2; 3), in order to supply electricity stably to each of said plurality of LED strips (4) coupled in parallel to each of said plurality of sectional controllers (2; 3), and each of said plurality of sectional controllers (2; 3) is also configured to receive the main control signal output from the main controller (1) and to analyze and process the main control signal into different output control signals each causing a corresponding one of the plurality of LED strips (4) coupled in parallel to each of said plurality of sectional controllers (2; 3) to produce a corresponding change in light.

2. The system as claimed in claim 1, wherein the main controller (1) has a microcontroller module (12), a clock module (13), and a communication protocol module (15), the microcontroller module (12) has a microcontroller unit (MCU) storing firmware required for operation of the microcontroller unit (MCU), the clock module (13) is coupled to the microcontroller module (12) and is configured to synchronize frequencies of signals sent out by the microcontroller module (12), and the communication protocol module (15) is coupled to the microcontroller module (12) and is configured to perform signal encoding in cooperation with the microcontroller module (12) in order for the microcontroller module (12) to send out the main control signal, wherein the main control signal is executable by the plurality of sectional controllers (2; 3).

3. The system as claimed in claim 2, wherein the communication protocol module (15) generates encoded contents including but not limited to at least one of a guide code, an address code, a function code, a signal accumulation code or a check code.

4. The system as claimed in claim 2, wherein the main controller (1) comprises a wireless receiver module (14) coupled to the microcontroller module (12), and the wireless receiver module (14) is configured to receive the operation signal, which is transmitted wirelessly by an external remote control, and guide the operation signal into the microcontroller module (12) for analysis and compiling.

5. The system as claimed in claim 4, wherein the main controller (1) comprises a voltage stabilizer module (11), and the voltage stabilizer module (11) is configured to transform and stabilize the DC supply power input into the main controller (1) and convert the DC supply power into a stabilized DC voltage suitable for use by modules in the main controller (1).

6. The system as claimed in claim 1, wherein each of said plurality of sectional controllers (2; 3) is provided therein with a voltage reduction module (23; 33) and a sectional control module (24; 34), each said voltage reduction module (23; 33) is configured to receive the DC supply power and produce a corresponding output voltage by voltage reduction and voltage stabilization, and each said sectional control module (24; 34) is configured to receive the main control signal and convert the main control signal into corresponding ones of said output control signals.

7. The system as claimed in claim 6, wherein the main controller (1) comprises a main input connector (17) and a main output connector (18), the main input connector (17) has a DC input contact (DCin) and a grounding contact (GND) and is configured to receive the DC supply power, the main output connector (18) has a DC output contact (DCout) and a grounding contact (GND), and the DC output contact (DCout) and the grounding contact (GND) of the main output connector (18) are in communication with the DC input contact (DCin) and the grounding contact (GND) of the main input connector (17) respectively.

8. The system as claimed in claim 7, wherein the main output connector (18) comprises a control contact (TX) electrically connected to the microcontroller module (12) in order to guide the main control signal outward.

9. The system as claimed in claim 8, wherein each of said plurality of sectional controllers (2; 3) comprises a sectional input connector (21; 31); each said sectional input connector (21; 31) has a DC input contact (DCin), a control contact (TX), and a grounding contact (GND); and the DC input contact (DCin), the control contact (TX), and the grounding contact (GND) of the sectional input connector (21; 31) of each of said plurality of sectional controllers (2; 3) are configured to be electrically connected to the DC output contact (DCout), the control contact (TX), and the grounding contact (GND) of the main output connector (18) respectively in order to guide the DC supply power and the main control signal into each of said plurality of sectional controllers (2; 3).

10. The system as claimed in claim 9, wherein each said sectional controller (2; 3) comprises output bases (CN1, CN2; CN3, CN4) each serving as an interface for coupling said corresponding output voltage and each of corresponding ones of said output control signals to a corresponding one of the plurality of LED strips (4) coupled in parallel to each of said plurality of sectional controllers (2; 3).

11. The system as claimed in claim 3, wherein each of said sectional plurality of controllers (2; 3) is provided therein with a voltage reduction module (23; 33) and a sectional control module (24; 34), each said voltage reduction module (23; 33) is configured to receive the DC supply power and produce a corresponding said output voltage by voltage reduction and voltage stabilization, and each said sectional control module (24; 34) is configured to receive the main control signal and convert the main control signal into corresponding ones of said output control signals.

12. The system as claimed in claim 11, wherein the main controller (1) comprises a main input connector (17) and a main output connector (18), the main input connector (17) has a DC input contact (DCin) and a grounding contact (GND) and is configured to receive the DC supply power, the main output connector (18) has a DC output contact (DCout) and a grounding contact (GND), and the DC output contact (DCout) and the grounding contact (GND) of the main output connector (18) are in communication with the DC input contact (DCin) and the grounding contact (GND) of the main input connector (17) respectively.

13. The system as claimed in claim 12, wherein the main output connector (18) comprises a control contact (TX) electrically connected to the microcontroller module (12) in order to guide the main control signal outward.

14. The system as claimed in claim 13, wherein each of said plurality of sectional controllers (2; 3) comprises a sectional input connector (21; 31);
  each said sectional input connector (21; 31) has a DC input contact (DCin), a control contact (TX), and a grounding contact (GND); and the DC input contact (DCin), the control contact (TX), and the grounding contact (GND) of the sectional input connector (21; 31) of each of said plurality of sectional controllers (2; 3) are configured to be electrically connected to the DC output contact (DCout), the control contact (TX), and the grounding contact (GND) of the main output connector (18) respectively in order to guide the DC supply power and the main control signal into each of said plurality of sectional controllers (2; 3).

15. The system as claimed in claim 14, wherein each of said plurality of sectional controllers (2; 3) comprises output bases (CN1, CN2; CN3, CN4) each serving as an interface for coupling said corresponding output voltage and each of corresponding ones of said output control signals to a corresponding one of the plurality of LED strips (4) coupled in parallel to each of said plurality of sectional controllers (2; 3).

16. The system as claimed in claim 5, wherein each of said plurality of sectional controllers (2; 3) is provided therein with a voltage reduction module (23; 33) and a sectional control module (24; 34), each said voltage reduction module (23; 33) is configured to receive the DC supply power and produce a corresponding output voltage by voltage reduction and voltage stabilization, and each said sectional control module (24; 34) is configured to receive the main control signal and convert the main control signal into corresponding ones of said output control signals.

17. The system as claimed in claim 16, wherein the main controller (1) comprises a main input connector (17) and a main output connector (18), the main input connector (17) has a DC input contact (DCin) and a grounding contact (GND) and is configured to receive the DC supply power, the main output connector (18) has a DC output contact (DCout) and a grounding contact (GND), and the DC output contact (DCout) and the grounding contact (GND) of the main output connector (18) are in communication with the DC input contact (DCin) and the grounding contact (GND) of the main input connector (17) respectively.

18. The system as claimed in claim 17, wherein the main output connector (18) comprises a control contact (TX) electrically connected to the microcontroller module (12) in order to guide the main control signal outward.

19. The system as claimed in claim 18, wherein each of said plurality of sectional controllers (2; 3) comprises a sectional input connector (21; 31); each said sectional input connector (21; 31) has a DC input contact (DCin), a control contact (TX), and a grounding contact (GND); and the DC input contact (DCin), the control contact (TX), and the grounding contact (GND) of the sectional input connector (21; 31) of each of said plurality of sectional controllers (2; 3) are configured to be electrically connected to the DC output contact (DCout), the control contact (TX), and the grounding contact (GND) of the main output connector (18) respectively in order to guide the DC supply power and the main control signal into each said sectional controller (2; 3).

20. The system as claimed in claim 19, wherein each of said plurality of sectional controllers (2; 3) comprises output bases (CN1, CN2; CN3, CN4) each serving as an interface for coupling said corresponding output voltage and each of corresponding ones of said output control signals to a corresponding one of the plurality of LED strips (4) coupled in parallel to each of said plurality of sectional controllers (2; 3).

* * * * *